United States Patent [19]

Bottum

[11] 4,236,281
[45] Dec. 2, 1980

[54] ROPE ATTACHING DEVICE

[76] Inventor: Charles F. Bottum, Rte. 3, Box 522-L, Coeur d'Alene, Id. 83814

[21] Appl. No.: 5,283

[22] Filed: Jan. 22, 1979

[51] Int. Cl.³ .............................................. F16G 11/00
[52] U.S. Cl. ................................ 24/115R; 24/132 R; 403/212; 403/273
[58] Field of Search ............ 24/115 R, 115 H, 115 K, 24/132 R, 132 AA, 132 WL, 120; 403/210–212, 273, 286, 305, 309, 313

[56] References Cited

U.S. PATENT DOCUMENTS

| 2,607,094 | 8/1952 | Nicosia | 24/132 R X |
| 3,797,947 | 3/1974 | Foote | 403/212 X |
| 3,896,527 | 7/1975 | Miller et al. | 24/132 R X |
| 4,117,998 | 10/1978 | Notoya | 24/115 R X |
| 4,140,412 | 2/1979 | Vitt | 403/273 X |

Primary Examiner—Kenneth Downey
Attorney, Agent, or Firm—Wells, St. John & Roberts

[57] ABSTRACT

A rope attaching device for splicing or forming a loop within a synthetic or natural fiber rope. The device includes a splicer body that is formed in two separate sections. Each section includes at least one rope receiving channel that is concave in cross section for receiving a length of rope therein. The two sections may be positioned facing one another, sandwiching a rope. A sheath formed of heat-shrink plastic material is provided that may be mounted over the juxtaposed sections. The sheath material will shrink upon application of heat to firmly grip and clasp the splicer body sections together securely clamping the rope.

13 Claims, 9 Drawing Figures

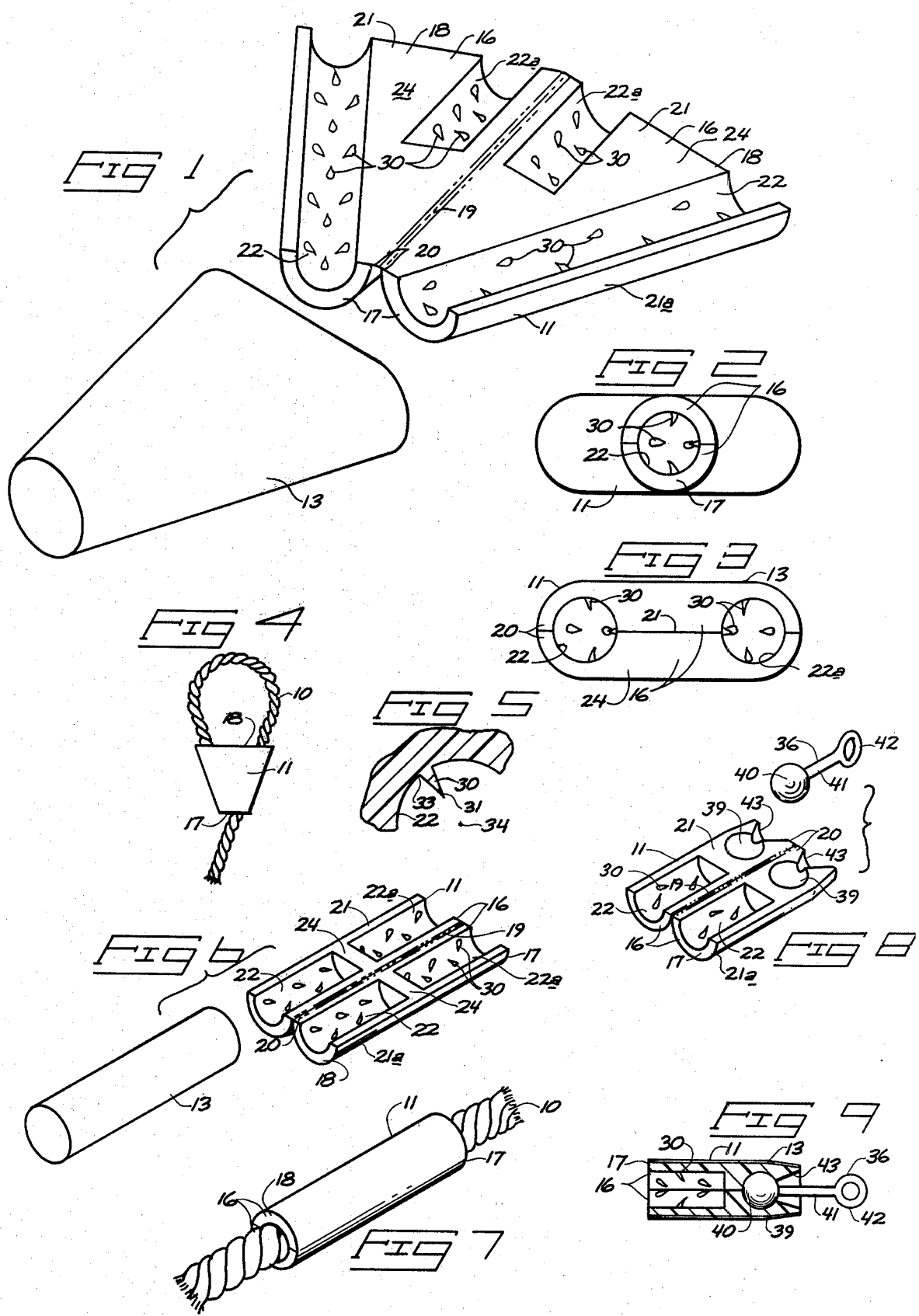

ROPE ATTACHING DEVICE

BACKGROUND OF THE INVENTION

The present invention is related to devices for attaching and splicing rope.

Much rope available today consists of multiple strand, multiple lay, man made fiber that is woven in various patterns to achieve strength and flexibility. These ropes, while very strong, are extremely difficult to splice due to the extreme skill required to handle the multiple lays in the complex weave or braided patterns.

The ends of ropes should be prepared or treated in such a manner as to prevent fiber ends and lays from unraveling. A common procedure for doing this has been to wrap the rope end with treated or waxed twine or cord. The twine or cord is secured by threading it through the body of the rope (termed "serving") or by back splicing the various rope lays. To create an eye or loop in the rope, each lay of the rope should be "served". The lays are then woven into the body of the rope over a distance which would allow each lay to be interwoven with another lay at least two times. This achieves a strong union of the rope lays, strengthening the splice as pressure is exerted against the eye or loop. Such splicing requires a substantial amount of time and skill.

Products presently available are serviceable for hollow core types of rope for the purpose of creating an eye splice. However, the design of such products is such as to create a stiffness in the rope body ahead of the splice area. In addition, they present some difficulty in use due to the force required to create the splice.

U.S. Pat. No. 3,952,376 granted to Jay Scott Ellis on Jan. 7, 1975 discloses an apparatus for securing two ropes together on opposite sides of a friction member. A heat shrinkable tube may be placed over the joined rope sections to surround the area adjacent the friction member. Heat may then be applied to the tube, causing it to shrink about the rope sections and drive them into forceable engagement with one another and the friction member. Heat shrinkable plastics are typically flexible. Therefore, the heat shrinkable tube allows flexure of the engaged rope sections relative to one another against the friction member. This can produce wear and the rope sections may be twisted out of their original parallel relationship and thereby lose the grip against the friction member.

The present invention allows quick and efficient splicing of rope wherein the splice formed is of a permanent nature. For this purpose, two relatively rigid sections of a splicer body are provided in conjunction with a tubular heat shrinkable sheath that is adapted to fit over the closed splicer body sections and may be shrunk by application of heat to securely clamp a rope between the two sections.

BRIEF DESCRIPTION OF THE DRAWINGS

FIG. 1 is an exploded pictorial view of one form of the present invention;

FIG. 2 is an end view of the FIG. 1 embodiment;

FIG. 3 is a view of an opposite end of the FIG. 1 embodiment.

FIG. 4 is a view of the FIG. 1 embodiment mounting the rope to form a loop therein;

FIG. 5 is an enlarged fragmentary view of a portion of a splicer body of my invention and a rope gripping element provided thereon;

FIG. 6 is a pictorial view of another embodiment of the present invention for splicing opposed ends of ropes together;

FIG. 7 is a pictorial view of the FIG. 6 embodiment mounted in place to splice two rope ends;

FIG. 8 is an exploded pictorial view of the third form of the present invention; and FIG. 9 is a sectional view of the FIG. 8 embodiment.

DETAILED DESCRIPTION OF A PREFERRED AND ALTERNATE EMBODIMENTS

A first form of the present invention is illustrated in FIGS. 1 through 4, a second form is illustrated in FIGS. 6 and 7, a third form is shown in FIGS. 8 and 9. All forms of the present invention are intended to be used for splicing or forming a loop in a rope 10. The rope 10 is preferably formed of natural or man-made fibers woven together and braided.

The present device is utilized to operate at ends of the rope 10 for the purpose of providing a splice or forming a loop of a selected size at the rope end. The form of the invention illustrated in FIG. 1 is utilized to form a loop at a rope end. The FIG. 2 embodiment is utilized to splice rope ends together and the FIG. 8 and 9 embodiment is utilized to fit over one end of a rope to seal the end and present a pivoted eyelet arrangement at the rope end.

The attaching device of the present invention is generally designated in the drawings by the reference character 11. All forms basically include a splicer body 12 and a heat shrinkable sheath 13. The splicer body 12 is formed in two sections 16 and is preferably molded of synthetic plastic resins. Each section 16 extends between opposed ends 17 and 18.

The two sections of the splicer body 12 may be formed integrally of a single piece of material joined by an integral hinge member 19 extending between the ends 17 and 18 along sides 20 of the halves 16. The hinge 19 defines a hinge axis about which the sections 16 are symmetrical. The hinge 19 may be formed along relatively planar surfaces 21 that engage one another when the sections 16 are folded about the hinge axis against one another to sandwich a rope therebetween. An exterior surface 21a of the sections 16 may be grooved, roughened or otherwise treated to provide a maximum purchase for the cover.

Each section 16 includes at least one channel 22 that is concave in cross section and defined by arcuate channel walls 23. The FIG. 1 embodiment shows two such channels 22. The first channel 22 opens at both ends 17 and 18 while a second channel 22a extends from an opening at end 18 to a closed end. The channels of the FIG. 1 embodiment are angularly offset from one another, converging from the end 18. The channels 22 that extend through the sections 16 are adapted to receive the rope 10 at a point spaced along its length from its free end. The second channels 22a are adapted to receive an end of the rope that is adjacent to the half ends 18. When the two sections 16 are closed over the rope section and end, a loop is formed as illustrated in FIG. 4.

The FIG. 1 embodiment includes relatively rigid webs 24 between the channels 22 and 22a. These webs reinforce the device 11 and define the surfaces 21.

Each of the disclosed embodiments include rope gripping elements 30 (FIG. 5) formed integrally within at least one of the sections 16 and preferably both. The rope gripping elements are preferably conical in configuration having pointed ends 31 that protrude into the channels 22, 22a. They also include bases 33 along the channel walls 23. Preferably, the gripping elements 30 project radially toward an axis as shown by a point 34 in FIG. 5. The axis may be described as the longitudinal axis of a bore formed by the two facing channels 22 when the sections of the splicer body 12 are closed to sandwich a rope between them. It is preferred that the pointed ends 31 be spaced from the channel walls 23 radially by a distance equal to one half the distance from the walls to the axis. Furthermore, it is preferred that the diameter of the bases 33 be approximately one half of the radial distance from the walls 23 to the points 31.

It is also preferable that the gripping elements 30 be canted axially toward one of the ends 17 or 18, depending upon the purpose for the device. For example, the gripping elements of the FIG. 1 embodiment will be canted toward the body ends 17. The gripping elements of the FIG. 6 embodiment will be canted in opposite directions toward closed ends of the channels. Likewise, the FIG. 8 embodiment will include gripping elements that are canted toward the closed ends of its channels. This serves to secure the device on the rope at the selected position and resists tension applied between the rope and device which would ordinarily pull the rope free of the splicer body 12.

The FIGS. 6 and 7 embodiment is provided for splicing ends of ropes together. Here, the channels 22, 22a formed in each splicer body section 16 are coaxial. They open on the opposite body ends 17 and 18 and extend inwardly to closed ends that are spaced axially apart. The rigid web 24 extends between the closed ends of the channel to provide rigidity at the joined extreme ends of the rope.

The FIGS. 8 and 9 embodiment is provided to include an eyelet means 36 mounted at an end 18 of the splicer body 12. The eyelet means 36 is mounted in alignment with the channels for pivotal movement relative to the splicer body. Means 36 includes recesses 39 that are complementary and symmetrical about the axis of the hinge 19. The recesses 39 may be spherical and complementary to a pivot base 40 formed on an eyelet means 36. A shank 41 extends outwardly from the pivot base 40 to an eyelet 42. A flared opening 43 is provided at the ends of the halves 16 to allow relatively free pivotal movement of the shank relative to the splicer body.

The FIG. 1 embodiment of the present invention is used to form a loop at an end of the rope. To do this, the rope is first examined and, if comprised of man made fibers, the end is heated to melt the fiber ends to prevent unraveling. The device may then be attached to the rope. This is done by slipping the heat shrink sheath 13 over the rope end to a position thereon beyond the area selected for the loop. The splicer body 12 is then fitted to the rope by pressing a section of the rope into the open ended channel 22 of one of the splicer body sections 16. The free end of the rope is then brought around and pressed into engagement within the adjacent channel 22a with the rope end in abutment with the closed end of the channel.

The splicer body 12 is enclosed by pivoting the remaining body section 16 about the hinge axis and over the rope to sandwich the rope end and engaged rope section between the channels 22 and 22a. This forms the loop.

The heat shrink sheath 13 is then moved over the assembled sections 16 to encase the exterior of the splicer body. Heat is then applied to sheath 13, causing it to shrink and thereby secure the halves 16 together against the rope and thereby secure the rope in relation to the splicer body. The gripping elements 30 will dig into and between the fibers and lays of rope to firmly secure the rope against tension exerted between the splicer body 12 and rope 10.

A rope splice may be performed with the embodiment shown in FIGS. 6 and 7. Prior to splicing, the rope ends are prepared as described above or otherwise trimmed to present abrupt ends that will fit easily within the coaxial channels. The rope ends are then pressed into the channels and the splicer body 12 is closed onto the ropes, sandwiching the ends between the oppositely facing channels 22. The tubular heat shrink sheath 13, previously located about the rope, is then moved over the exterior surfaces of the joined splicer body halves and heated to shrink and securely clamp the halves 16 on the rope ends. The finished splice is illustrated in FIG. 7.

A single end of a rope may be treated by using one longitudinal section of the splicer body 12 including opposed hinged sections thereof. For example, the splicer body as illustrated in FIG. 6 may be cut in half transversely between the closed ends of the channels. This will provide two separate end caps that may be placed at opposite ends of a rope and secured thereto by a separate half of the heat shrink sheath 13.

A pivotal eyelet means 36 may be secured at the end of a rope through the embodiment of my invention illustrated in FIGS. 8 and 9. Mounting of the rope to this device is similar to that described for the end caps and splicing embodiment described above. Prior to folding the sections 16 onto one another, however, the eyelet base 40 is inserted into one of the recesses 39. The sections 16 may then be closed onto each other and about the rope to secure the device to the rope end and provide a pivotal eyelet extending outwardly from the end of the rope. The heat shrink sheath can be placed over the two splicer body sections 16 and heated to secure them to the rope end.

A distinct advantage of the present invention is the provision of the splicer body 12, being formed of a material that resists deformation due to forces applied through the attached rope members. The portions of the rope engaged therewith, will therefore not flex or move within the channels. Wear within the channels is negligible. Furthermore, the gripping elements 30 provide maximum gripping force against the portions of the rope engaged therewith to prevent axial movement of the rope within the channels.

In the loop version (FIGS. 1 through 4) the rope end is spaced away from the engaged portion of the rope so that both rope portions may be secured individually without chance that they may rub against each other or be worked by external forces against each other to wear and loosen within the splicer body. The web members 24 serve to reinforce the loop or splice at otherwise weak points.

It is to be understood that the above description and attached drawings are given by way of example to set forth a preferred and alternate form of my invention. The illustrated details might be modified as necessary to meet the requirements of particular applications of the invention.

What I claim is:

1. A rope attaching device, comprising: a rope splicer body extending from a front end to a rear end in which the body has a pair of symmetrical body sections with first complementary concave channels formed therein between the front end and the rear end defining a rope passageway through the body to receive a rope section therein when the two sections are placed together;

said pair of symmetrical sections having second complementary concave channels formed therein extending from the front and toward the rear end at a converging angle with respect to the first complementary concave channels to form a rope end receptacle to receive a rope end therein and form a rope loop between the rope end and the rope section forward of the front end when the two sections are placed together;

said rope splicer body comprising a plurality of pointed rope gripping elements projecting into the concave channels to penetrate the rope section and the rope end to firmly grip the rope section and the rope end in said channels; and sheath means complementary to the exterior shape of the rope splicer body when the sections are placed together to encase the splicer body and securely hold the section firmly together and prevent the sections from separating.

2. The device as defined by claim 1 further comprising a hinge member joining said sections to one another.

3. The device as defined by claim 2 wherein said sections are formed of flexible plastic material;

the hinge member being integral with said sections along a side edge thereof.

4. The device as defined in claim 1 wherein the concave channels form substantially cylindrical bores along axes and wherein the gripping elements project radially toward the axes a radial distance approximately equal to one half the distance from channel walls to the axes.

5. The device as defined by claim 4 wherein the rope gripping elements are conical, having bases on arcuate walls of said sections and wherein the diameter of the bases is substantially equal to one half the radial distance.

6. The device as defined by claim 5 where the cone shaped gripping elements are canted longitudinally to project radially and axially into the rope end and rope section to secure the rope end and rope section in the channels.

7. The device as defined by claim 1 wherein the rope end receptacle has a longitudinal axis that intersects the rope passageway adjacent the rear end.

8. The device as defined by claim 1 wherein the rope splicer body has an enlarged front end and a reduced rear end and is tapered between the front end and the rear end.

9. The device as defined by claim 1 wherein the sheath means includes an enlarged front end and a reduced end and is tapered from the front end to the rear end to complementarily receive the splicer body.

10. The device as defined by claim 6 wherein the cone shaped gripping elements are canted longitudinally toward the rear end of the rope splicer body.

11. A rope attaching device, comprising: a rope splicer body extending from a front end to a rear end in which the body has a pair of symmetrical body sections with complementary concave channels formed therein adjacent the rear end defining a rope end receptacle having an opening at the rear end of the body to receive a rope end therein;

said pair of symmetrical sections having complementary recesses formed adjacent the front end defining an eyelet receiving cavity having an opening at the front end;

an eyelet means mounted in the eyelet receiving cavity and extending outward through the opening and terminating in an eyelet section forward of the front end of the rope splicer body;

said rope splicer body comprising a plurality of pointed rope gripping elements projecting into the concave channels to penetrate the rope end to firmly grip the rope and in said rope end receptacle; and sheath means complementary to the exterior shape of the rope splicer body when the sections are placed together to encase the splicer body and securely hold the section firmly together to securely interconnect the rope end and the eyelet means together.

12. The device as defined in claim 11 wherein the eyelet means includes a pivot base complementary to the eyelet receiving cavity and pivotably receivable therein; a shank extending through the opening from the pivot base to the eyelet section.

13. The device as defined in claim 11 wherein the eyelet receiving cavity and the rope end receptacle are axially aligned within the rope splicer body.

* * * * *